United States Patent
Patel et al.

(10) Patent No.: US 9,003,227 B1
(45) Date of Patent: Apr. 7, 2015

(54) RECOVERING FILE SYSTEM BLOCKS OF FILE SYSTEMS

(75) Inventors: Dixitkumar Vishnubhai Patel, Monroe, NJ (US); Srinivasa Rao Vempati, Upton, MA (US); Jean-Pierre Bono, Westborough, MA (US); Luogeng Dai, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 238 days.

(21) Appl. No.: 13/539,084

(22) Filed: Jun. 29, 2012

(51) Int. Cl.
*G06F 11/00* (2006.01)
*G06F 11/16* (2006.01)

(52) U.S. Cl.
CPC ..................... *G06F 11/165* (2013.01)

(58) Field of Classification Search
CPC . G06F 11/0727; G06F 11/10; G06F 11/1004; G06F 11/1044; G06F 11/1048; G06F 11/1068; G06F 11/1076; G06F 11/1084; G06F 11/1092; G06F 11/1096

USPC ........... 714/6.1, 6.2, 6.23, 6.24, 6.3, 6.31, 15, 714/42, 52, 54

See application file for complete search history.

(56) References Cited

U.S. PATENT DOCUMENTS

| | | | |
|---|---|---|---|
| 6,785,786 B1 * | 8/2004 | Gold et al. | 714/6.3 |
| 7,464,125 B1 * | 12/2008 | Orszag et al. | 1/1 |
| 8,612,382 B1 * | 12/2013 | Patel et al. | 707/609 |
| 2004/0268068 A1 * | 12/2004 | Curran et al. | 711/162 |
| 2006/0077724 A1 * | 4/2006 | Chikusa et al. | 365/189.05 |
| 2010/0169707 A1 * | 7/2010 | Mathew et al. | 714/7 |
| 2011/0154100 A1 * | 6/2011 | Lee et al. | 714/4.1 |

* cited by examiner

*Primary Examiner* — Joseph D Manoskey
(74) *Attorney, Agent, or Firm* — Deepika Bhayana; Jason A. Reyes; Krishnendu Gupta

(57) ABSTRACT

A method is used in recovering file system blocks of file systems. A first read error is encountered upon reading a file system block of a file system. The file system block includes a first set of chunks. A second read error is encountered upon reading a duplicate copy of the file system block. The duplicate copy of the file system block includes a second set of chunks. Each chunk of the first and second sets of chunks is evaluated. Based on the evaluation, the file system block is recovered.

18 Claims, 12 Drawing Sheets

RECOVERING FILE SYSTEM BLOCKS OF FILE SYSTEMS

BACKGROUND

1. Technical Field

This application relates to recovering file system blocks of file systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

A traditional storage array (herein also referred to as a "data storage system", "disk storage array", "disk array", or simply "array") is a collection of hard disk drives operating together logically as a unified storage device. Storage arrays are designed to store large quantities of data. Storage arrays are typically used to provide storage space for one or more computer file systems, databases, applications, and the like. For this and other reasons, it is common for storage arrays to be logically partitioned into chunks of storage space, called logical units, or LUs. This allows a unified storage array to appear as a collection of separate file systems, network drives, and/or Logical Units.

A hard disk drive (also referred to as "disk") is typically a device can be read from or written to and is generally used to store data that will be accessed by the storage array. The hard disk drive is typically referred to as random access memory and is familiar to those skilled in the art. A disk may be a physical disk within the storage system. A LUN may be a logical unit number which is an identifier for a Logical Unit. Each slice of data may have a mapping on the location of the physical drive where it starts and ends; a slice may be sliced again.

A hard disk drive (also referred to as "disk") is typically a device including a magnetic head (also referred to as "head"), a disk arm, a motor, and one or more platters that store information. The motor turns a platter underneath the magnetic head. The platter contains electrically encoded data that is detected by the magnetic head as the head passes over the platter. The platter can be read from or written to and is generally used to store data that will be accessed by the storage array. Typically, data is arranged in concentric circles on the platter, which are divided into the minimum storage unit of sectors. The magnetic head is moved along a radius of the platter, and the magnetic head reader/writer accesses particular locations within the platter as the platter spins under the magnetic head.

Disk arrays may also include groups of physical disks that are logically bound together to represent contiguous data storage space for applications. For example, disk arrays may be divided into redundant array of inexpensive disks (RAID) groups, which are disk arrays created by logically binding individual physical disks together to form the RAID groups. RAID groups represent a logically contiguous address space distributed across a set of physical disks. Each physical disk is subdivided into pieces used to spread the address space of the RAID group across the group (along with parity information if applicable to the RAID level). The physically contiguous pieces of the physical disks that are joined together to create the logically contiguous address space of the RAID group are called stripes. Stripes may form blocks and blocks may be allocated to create logical representations of storage space for use by applications within a data storage system.

Large storage arrays today manage many disks that are not identical. Storage arrays use different types of disks, i.e., disks with different RAID (Redundant Array of Independent or Inexpensive Disks) levels, performance and cost characteristics. In the industry there have become defined several levels of RAID systems. There are a number of different RAID (Redundant Array of Independent or Inexpensive Disks) levels and techniques that may be used in connection with providing a combination of fault tolerance and/or improved performance for data storage devices. Different RAID levels (e.g., RAID-1, RAID-5, RAID-6, and the like) may provide varying degrees of fault tolerance. Further, RAID parity schemes may be utilized to provide error detection during the transfer and retrieval of data across a storage system.

Generally, a RAID system is an array of multiple disk drives which appears as a single drive to a data storage system. A goal of a RAID system is to spread, or stripe, a piece of data uniformly across disks (typically in units called chunks), so that a large request can be served by multiple disks in parallel.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

The accuracy and consistency of a file system is necessary to relate applications and data used by those applications. However, there may exist the potential for data corruption in any computer system and therefore measures are taken to periodically ensure that the file system is consistent and accurate. In a data storage system, hundreds of files may be created, modified, and deleted on a regular basis. Each time a file is modified, the data storage system performs a series of file system updates. These updates, when written to a disk storage reliably, yield a consistent file system. However, a file system can develop inconsistencies in several ways. Problems may result from an unclean shutdown, if a system is shut down improperly, or when a mounted file system is taken offline improperly. Inconsistencies can also result from defective hardware or hardware failures. Additionally, inconsistencies can also result from software errors or user errors.

Additionally, the need for high performance, high capacity information technology systems is driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable and highly efficient so that critical data is not lost or unavailable.

A file system checking (FSCK) utility provides a mechanism to help detect and fix inconsistencies in a file system. The FSCK utility verifies the integrity of the file system and optionally repairs the file system. In general, the primary function of the FSCK utility is to help maintain the integrity of the file system. The FSCK utility verifies the metadata of a file system, recovers inconsistent metadata to a consistent state and thus restores the integrity of the file system.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

SUMMARY OF THE INVENTION

A method is used in recovering file system blocks of file systems. A first read error is encountered upon reading a file system block of a file system. The file system block includes a first set of chunks. A second read error is encountered upon reading a duplicate copy of the file system block. The duplicate copy of the file system block includes a second set of chunks. Each chunk of the first and second sets of chunks is evaluated. Based on the evaluation, the file system block is recovered.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
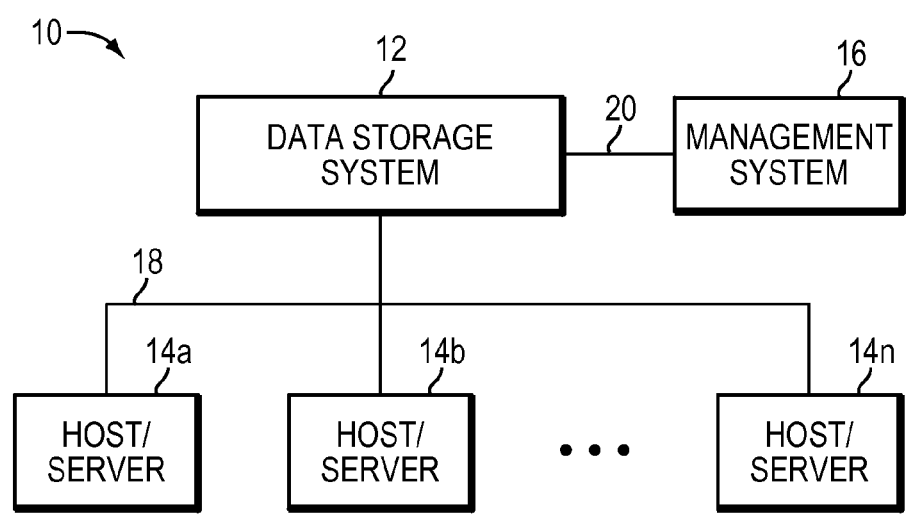
FIGS. 1-3 are examples of an embodiment of a computer system that may utilize the techniques described herein.

Described below is a technique for use in recovering file system blocks of file systems, which technique may be used to provide, among other things, encountering a first read error upon reading a file system block of a file system, where the file system block includes a first set of chunks, encountering a second read error upon reading a duplicate copy of the file system block, where the duplicate copy of the file system block includes a second set of chunks, evaluating each chunk of the first and second sets of chunks, and based on the evaluation, recovering the file system block.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect data block which in turn points to other data blocks or indirect blocks. A mapping pointer includes information that help map a logical offset of a file system block to a corresponding physical block address of the file system block.

File System Checking (FSCK) is a process by which a data storage system verifies integrity of a file system and optionally repairs any inconsistencies found during verification of the file system. In at least some systems, a FSCK utility verifies the metadata of a file system, recovers inconsistent metadata to a consistent state and thus restores the integrity of the file system. To verify the metadata of a file system, the FSCK utility traverses the metadata of the file system and gathers information, such as status and bitmaps for the traversed metadata. The FSCK utility stores the gathered information in a memory of the data storage system. The FSCK utility then validates the correctness of the metadata using the information stored in the memory. Additionally, the FSCK utility uses the stored information to restore the integrity of the file system by fixing inconsistencies found during validation of metadata.

Generally, in typical file systems, inodes, which include the metadata for a file, are stored alongside the data that comprises the content of the file in a physical storage media (e.g. disks) in a data storage system. As such, physical storage devices store both the data itself and the file system metadata that is related to it. For example, file systems may divide file system storage space of a file system into cylinders that include a certain amount of storage, e.g., 64 MB of storage space. Furthermore, each cylinder is managed to track physical blocks within it that are free or already allocated and inode structures that are free or already allocated. Thus, each cylinder includes a cylinder group map block including metadata that includes this information and maps inodes to physical block numbers in the cylinder. Further, each file system block of a file of a file system is associated with a per block metadata (also referred to herein as "BMD") that stores metadata for the file system block. Further, metadata of a file system may include inodes and indirect blocks.

The loss or corruption of any of numerous types of metadata in a system such as that described above can result in inconsistencies or corruption of a file system. For example, assume that metadata within one or more cylinders that keeps track of which blocks of storage or inodes are free and which are allocated is corrupted or lost. Without such metadata, the file system is unable to write additional files, as a determination needs to be made to identify a free inode structure and a sufficient number of free data blocks. As another example, if the metadata for a particular inode is lost or corrupted, it may not be possible to access the corresponding file. As yet a further example, metadata in the file system may be corrupted so that two or more inodes both indicate that they own the same data block, resulting in inconsistencies regarding which inode actually does own the data block and has the ability to control and overwrite it. It should be appreciated that such corruptions or inconsistencies may develop in any one of numerous ways, including hardware failures, software bugs, and so on. In addition, it should be appreciated that the types of inconsistencies and problems with the file systems mentioned above are described merely for illustrative purposes, and that numerous other types of inconsistencies or problems are possible.

Generally, one mechanism for recovering a file system from corruption or inconsistencies is to create one or more copies of metadata of the file system such that if the file system is unable to access a primary copy of the metadata, a duplicate copy of the metadata is used by the file system. Further, each metadata of a file system is associated with a checksum for verifying integrity and consistency of the metadata such that the checksum may either be stored within the metadata object or be stored in a per block metadata (also referred to herein as "BMD").

Further, a file system may be unable to access metadata stored on a storage device (e.g., disk) due to a read error such as a bad sector media error. A bad sector media error in response to a request to read or write to a specified disk sector indicates a loss of at least a sector of data because errors have occurred not only in the specified disk sector but also in at least one other sector in the same stripe across a RAID group. Therefore, the requested data cannot be read from the specified sector or reconstructed from sectors in the other disk drives of the RAID group. Typically, a bad sector media error is returned to a requesting application. Upon encountering a bad sector media error in response to read or write to a disk sector that stores a file system block including metadata of a file system, the file system attempts to read another disk sector that stores a duplicate copy of the file system block.

Conventionally, if a file system is able to successfully read a duplicate copy of a file system block including metadata of the file system upon encountering an error such as a bad sector media error in response to a request to access the file system block (a primary copy), an application may fully recover from the error. However, in such a conventional system, if a file system first encounters an error such as a bad sector media error in response to a request to access a file system block including metadata of a file system and then again encounters an error such as a bad sector media error in response to a request to access a duplicate copy of the file system block indicating a double fault, a user may lose a large amount of data of the file system associated with the metadata stored in the file system block thereby causing a data loss and unavailability of the large amount of user data. Further, in such a conventional system, if a file system is unable to access both primary and duplicate copy of metadata such that the metadata is critical for maintaining consistency of the file system, the file system may become completely inaccessible to a user. Moreover, a file system may receive a read error such as a data loss error in response to a request to access a file system block because one or more inconsistent sectors of the file system block may causes an error such as a bad sector media error. Further, in such a conventional system, if a duplicate copy of the file system block includes one or more inconsistent sectors, the file system is unable to recover the file system block even though the one or more inconsistent sectors of the duplicate copy is different from the one or more inconsistent sectors of the file system block. Thus, in such a conventional system a file system may need to be taken offline and a FSCK utility may need to be executed for detecting and correcting inconsistencies in the file system thereby making the file system inaccessible for the duration of the time it may take to recover the file system. Consequently, in such a conventional system, a file system may be taken offline for a significant duration of time if the file system receives an error in response to a request to access both a primary copy and duplicate copy of a file system block.

By contrast, in at least some implementations in accordance with the technique as described herein, if a file system encounters an error such as a data loss error in response to a request to read or write to a file system block of a file system and encounters the same error when attempting to read a duplicate copy of the file system block, the file system reads each sector of the file system block and the duplicate copy of the file system block, and consolidates information read from each sector of both copies of file system blocks in order to reconstruct contents of inconsistent sectors of the file system block. Further, in at least one embodiment of the current technique, contents of a reconstructed file system block of a file system is validated by using checksum information such that the reconstructed file system block is used by the file system for processing a read or write request from a user thereby completing the read or write request without having to take the file system offline for recovering the file system. Thus, using the current technique as described herein, data of a file system may be accessed even when the file system encounters a double fault when accessing metadata associated with the data of the file system. Thus, in at least one embodiment of the current technique, a file system consolidates contents of consistent sectors of a file system block with contents of consistent sectors of a duplicate copy of the file system block in order to reconstruct a consistent copy of the file system block upon encountering an error when accessing the file system block and the duplicate copy of the file system block.

In at least some implementations in accordance with the technique as described herein, the use of the recovering file system blocks of file systems technique can provide one or more of the following advantages: reducing the amount of time required for recovering a file system by efficiently recovering metadata of the file system, preventing loss of user data by reconstructing a consistent file system block from two copies of inconsistent file system blocks, preventing unavailability of user data by efficiently recovering metadata of a file system, and improving access to a file system by avoiding taking the file system offline for recovering a file system block.

Referring now to FIG. 1, shown is an example of an embodiment of a computer system such as a data storage system that may be used in connection with performing the technique or techniques described herein. A data storage system may be a block based storage system 12 as described herein in FIG. 1. Further, a data storage system may be a file based data storage system as described herein below in FIG. 2. Further, a data storage system may include a block based data storage system component and a file based data storage system component.

While the block based storage system 12 may be configured in a variety of ways, in at least one embodiment, the block based storage system 12 is configured as a storage area network (SAN), such as a CLARiiON™ system, as produced by EMC Corporation of Hopkinton, Mass. While a file based storage system may be configured in a variety of ways, in at least one embodiment, the file based storage system is configured as a network attached storage (NAS) system, such as a Celerra™ system produced by EMC Corporation of Hopkinton, Mass.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the block based data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the block based data storage systems over an iSCSI or fibre channel connection and the management system may communicate with the block based data storage systems over a separate network connection using TCP/IP. It should be noted that although FIG. 1 illustrates communications between the hosts and block based data storage systems being over a first connection, and communications between the management system and the block based data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the block based data storage systems 12 to perform a data operation. For example, an application executing on one of the host computers 14a-14n may perform a read or write operation resulting in one or more data requests to the block based data storage systems 12.

The management system 16 may be used in connection with management of the block based data storage systems 12. The management system 16 may include hardware and/or software components. The management system 16 may include one or more computer processors connected to one or more I/O devices such as, for example, a display or other output device, and an input device such as, for example, a keyboard, mouse, and the like. A block based data storage system manager may, for example, view information about a current storage volume configuration on a display device of the management system 16. The manager may also configure a block based data storage system 12, for example, by using a management software to define a logical grouping of logically defined devices, referred to elsewhere herein as a storage group (SG), and restrict access to the logical group.

An embodiment of the block based data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). It should be noted that each of the data storage systems may operate stand-alone, or may also included as part of a storage area network (SAN) that includes, for example, other components such as other data storage systems, file based data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the block based data storage system 12 may also include other components than as described for purposes of illustrating the techniques herein.

Figure 2:
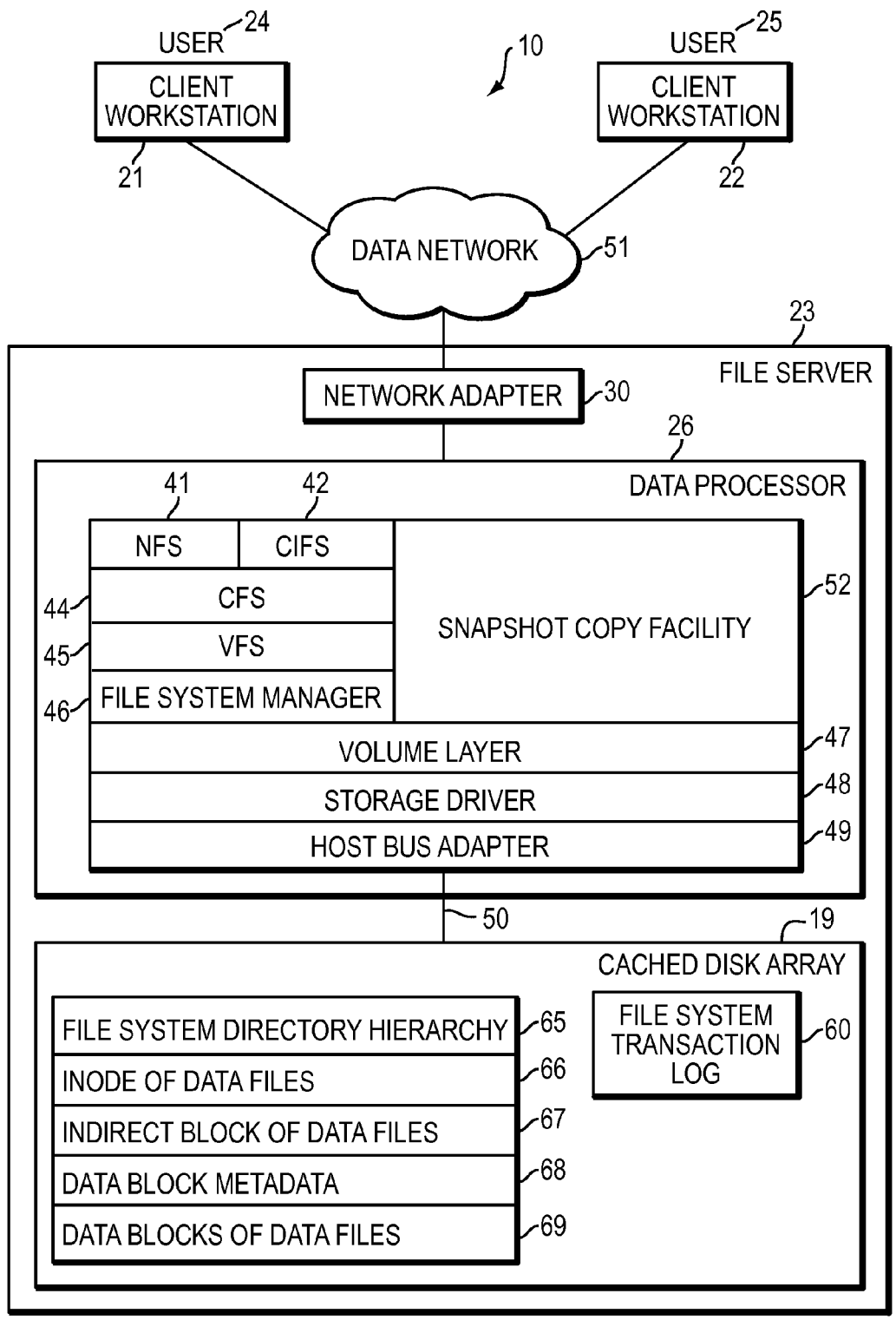

Referring now to FIG. 2, shown is an example of an embodiment of a file based data storage system that may be used in connection with performing the technique or techniques described herein. The file based data storage system 10 includes a data network 51 interconnecting clients 21, 22 and a data storage system such as a network file server 23 (also referred to simply as "file server"). The data network 51 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 2, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 51 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 51 by any one of a variety of connections as may be provided and supported in accordance with the type of data network 51.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 2 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 2, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 7 and 8. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60.

Figure 3:
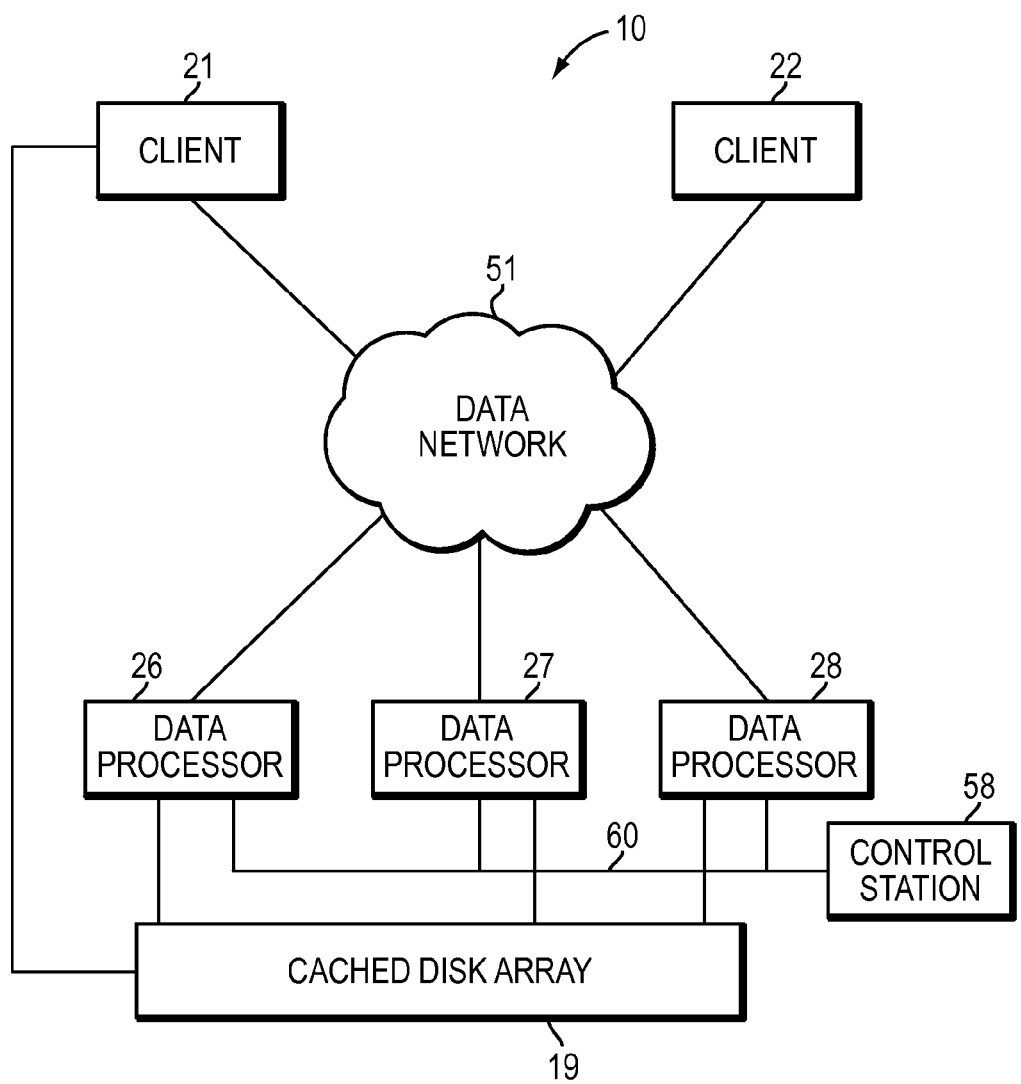

Referring now to FIG. 3, shown is the network file server 23 of FIG. 2 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 4:
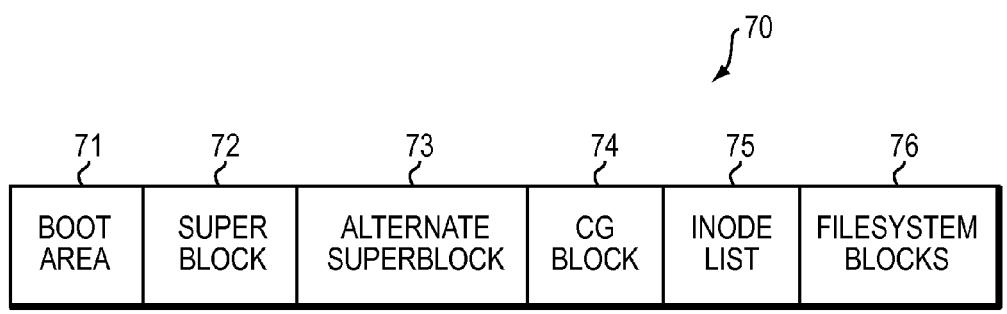
FIGS. 4-10 are diagrams illustrating in more detail components that may be used in connection with techniques herein.

Referring to FIG. 4, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Figure 5:
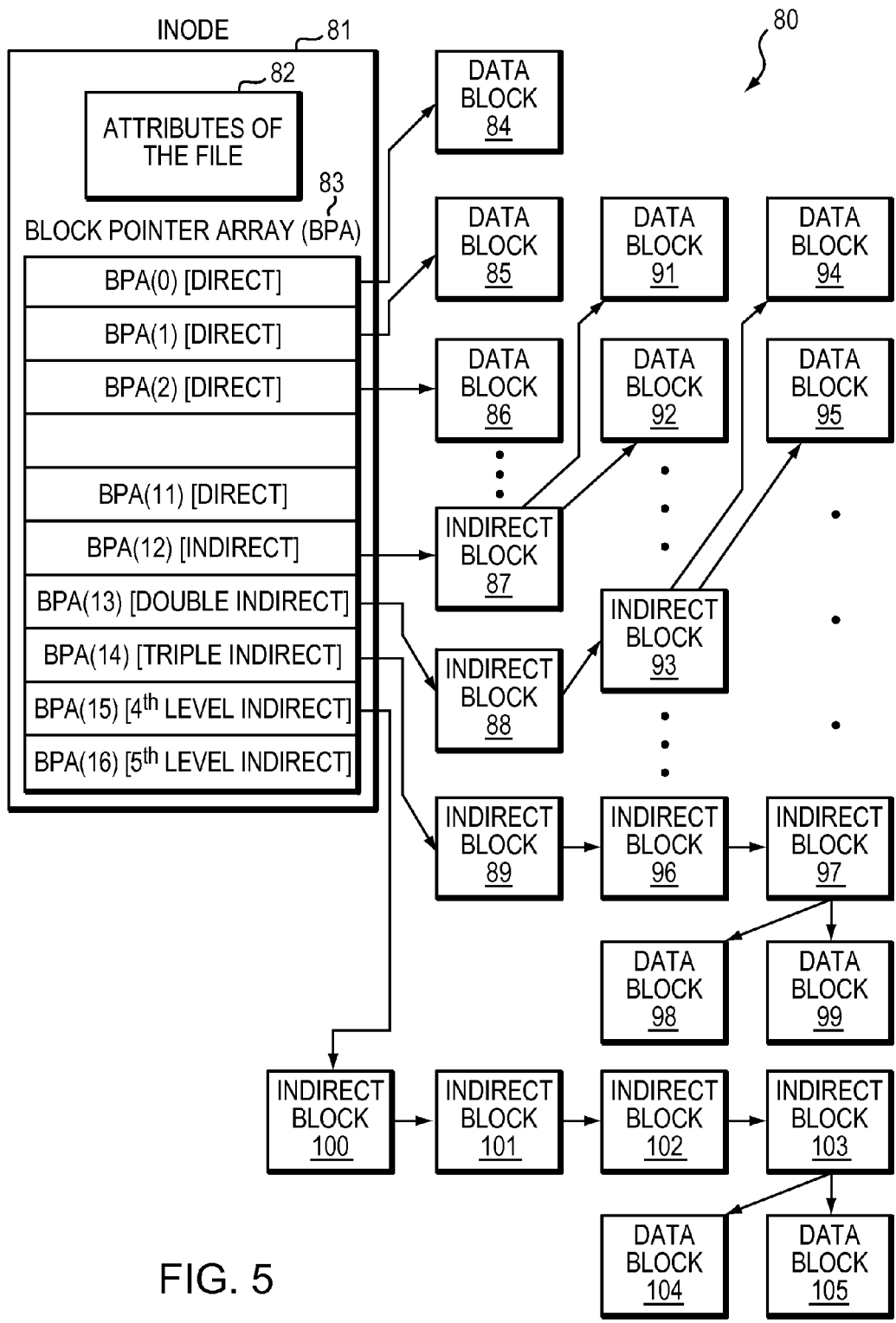

Referring to FIG. 5, shown is a representation of an inode of a file and a file system block tree hierarchy of the file that may be included in an embodiment using the techniques described herein. A file includes an inode 81 containing attributes 82 (such as atime and mtime) of the file, and a block pointer array 83. The block pointer array 83 has seventeen block pointer array entries BPA(0) to BPA(14). The first of up to twelve entries BPA(0) to BPA(11) directly point to the first of up to twelve data blocks (e.g., 84, 85, 86), of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 96 that points to an indirect block 97 that points to one or more additional data blocks (e.g., 98, 99). Similarly the file may include fourth (BPA(15)) and fifth (BPA(16)) level of indirections indicated by indirect blocks 100-103 and data blocks 104-105.

Figure 6:
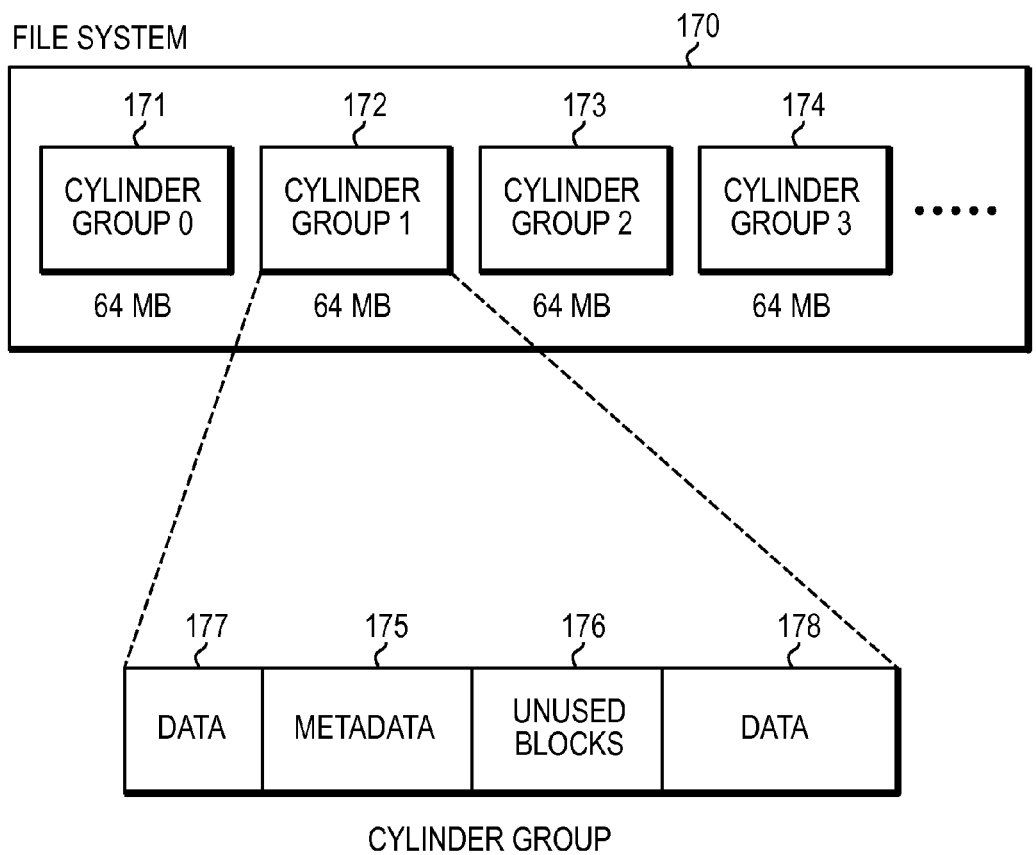

Referring to FIG. 6, shown is a more detailed representation of components that may be included in an embodiment using the techniques herein. A physical address space of a file system is typically divided into equal sized chunks. Each chunk is known as a cylinder group. In at least some embodiments of the current technique, size of the cylinder group may be 64 megabytes (MB). For example, in FIG. 6, file system 170 includes cylinder groups 171-174. A cylinder group in a file system includes a range of file system blocks. A part of each cylinder group stores metadata 175 of the file system occupying one or more file system blocks and a part of each cylinder group stores user's data 177, 178 occupying one or more file system blocks. Further, as illustrated in FIG. 6, metadata 175 may be located at the start of a cylinder group, at the end of the cylinder group or in between two portions containing data.

Figure 7:
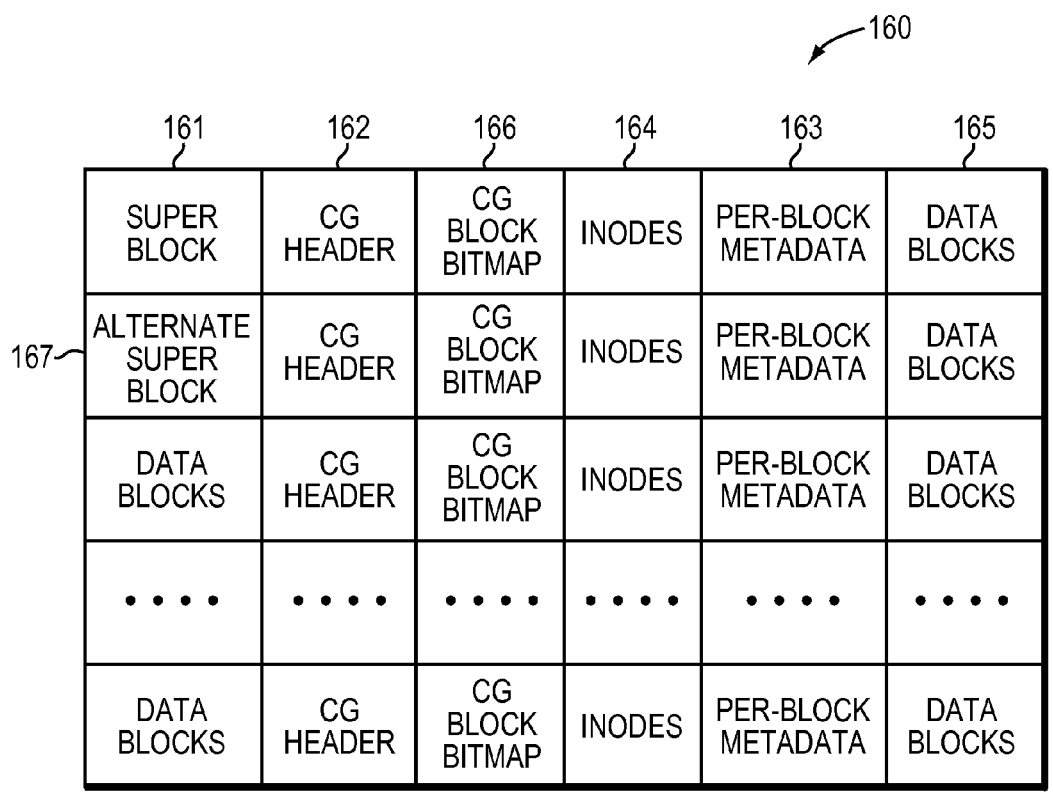

Referring to FIG. 7, shown is a memory map of a logical extent of a file system that may be included in an embodiment using the techniques herein. A logical extent of the file system is subdivided into self-contained cylinder groups. Each cylinder group is of fixed size, such that the size of the cylinder group is the granularity of storage provisioning for the file system. For example, if the file system block size is 8 kilobytes (KB), size of the file system is 4 gigabyte (GB) and size of the cylinder group is 64 megabytes (MB), the file system may include sixty four cylinder group entries, and each cylinder group entry may include 8192 file system blocks. A part of each cylinder group contains metadata of the file system. Other part of each cylinder group contains user's data that is stored in one or more data blocks. Further, each cylinder group includes metadata information that includes a redundant copy of the super-block of a file system, inodes of files of the file system, a bit map describing available blocks in the cylinder group, and information describing the usage of data blocks within the cylinder group. With reference to FIG. 7, each cylinder group (CG) of the file system 160 is a respective row in this memory map. A first cylinder group of the file system 160 indicated by first row of the memory map contains a superblock 161 of the file system, a cylinder group header 162, file system blocks for per-block metadata (BMD) 163 for storing metadata of file system blocks in the cylinder group, inodes 164 of files of file system 160, file system data blocks 165 for the cylinder group, and a cylinder group block bitmap 166 indicating whether or not each file system block in the cylinder group is allocated or not. A second cylinder group of the file system 160 indicated by second row of the memory map has the same format as the first cylinder group. The alternate superblock 167 of the second cylinder group is a copy of the superblock 161 of the first cylinder group. Other cylinder groups have the same format except they do not have a superblock. A file system block can be in one of three states: allocated, free, or reserved. A reserved file system block cannot be allocated or freed. The allocated/free state of a file system block is tracked in the cylinder group block bitmap. Each cylinder group maintains a per-block metadata (BMD) for all file system blocks that it owns. The file system 160 populates the per-block block metadata as and when a file system block is allocated—either for an indirect block or any other metadata block. The per-block metadata 163 is not directly accessible to a network client, and instead it is implicitly accessed in the process of a file system operation that makes use of the cylinder group or file system block contents. For example, the process of allocating or freeing a block of the cylinder group validates and updates block metadata owner state. It should be noted that the memory map of a cylinder group may include other fields (not shown in the FIG. 7) that may be included in a file system stored in data storage system 10.

Figure 8:
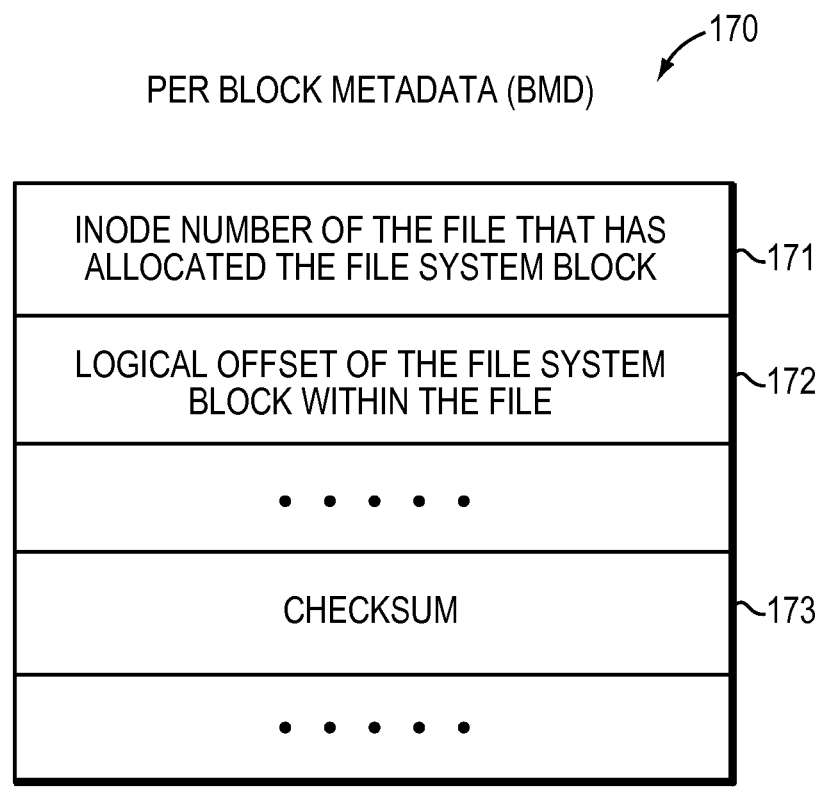

Referring to FIG. 8, shown is a representation of a per block metadata (also referred to as "BMD") for a file system data block that may be included in an embodiment using the techniques described herein. The per-block metadata 170 for a file system data block includes an inode number 171 of a file of the file system to which the data block has been allocated, the file system data block number and the logical offset of the file system data block 172. The per-block metadata 170 for a file system data block also includes an internal checksum 173 for protecting the integrity of the information stored in the per-block metadata 170. The per-block metadata for a file system data block may further include the state of the per-block metadata 170.

Figure 9:
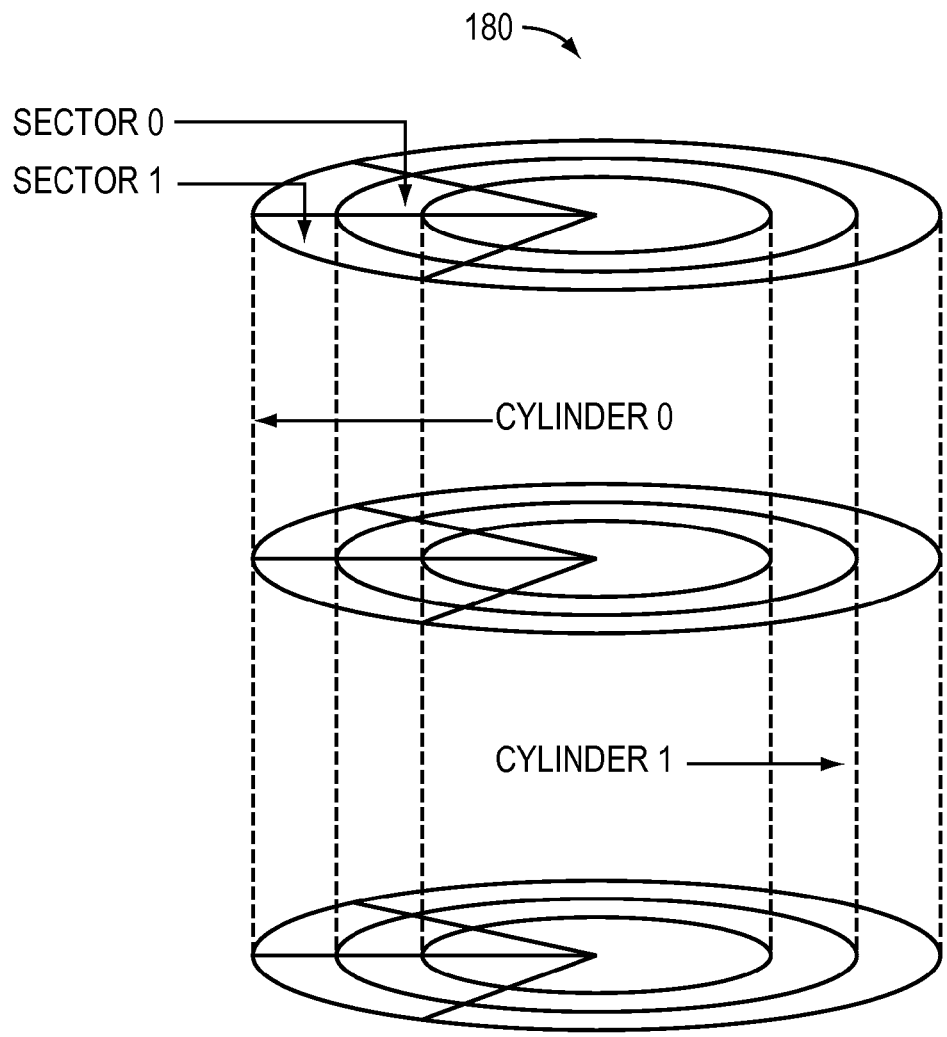

Referring to FIG. 9, shown is a detailed representation of components that may be included in an embodiment using the techniques described herein. FIG. 9 illustrates an example layout of a storage device such as a storage disk drive 180 organized into a set of cylinder groups such that each cylinder group of the set of cylinder group (e.g., cylinder 0, cylinder 1) is organized on a set of sectors (e.g., sector 0, sector 1).

Figure 10:
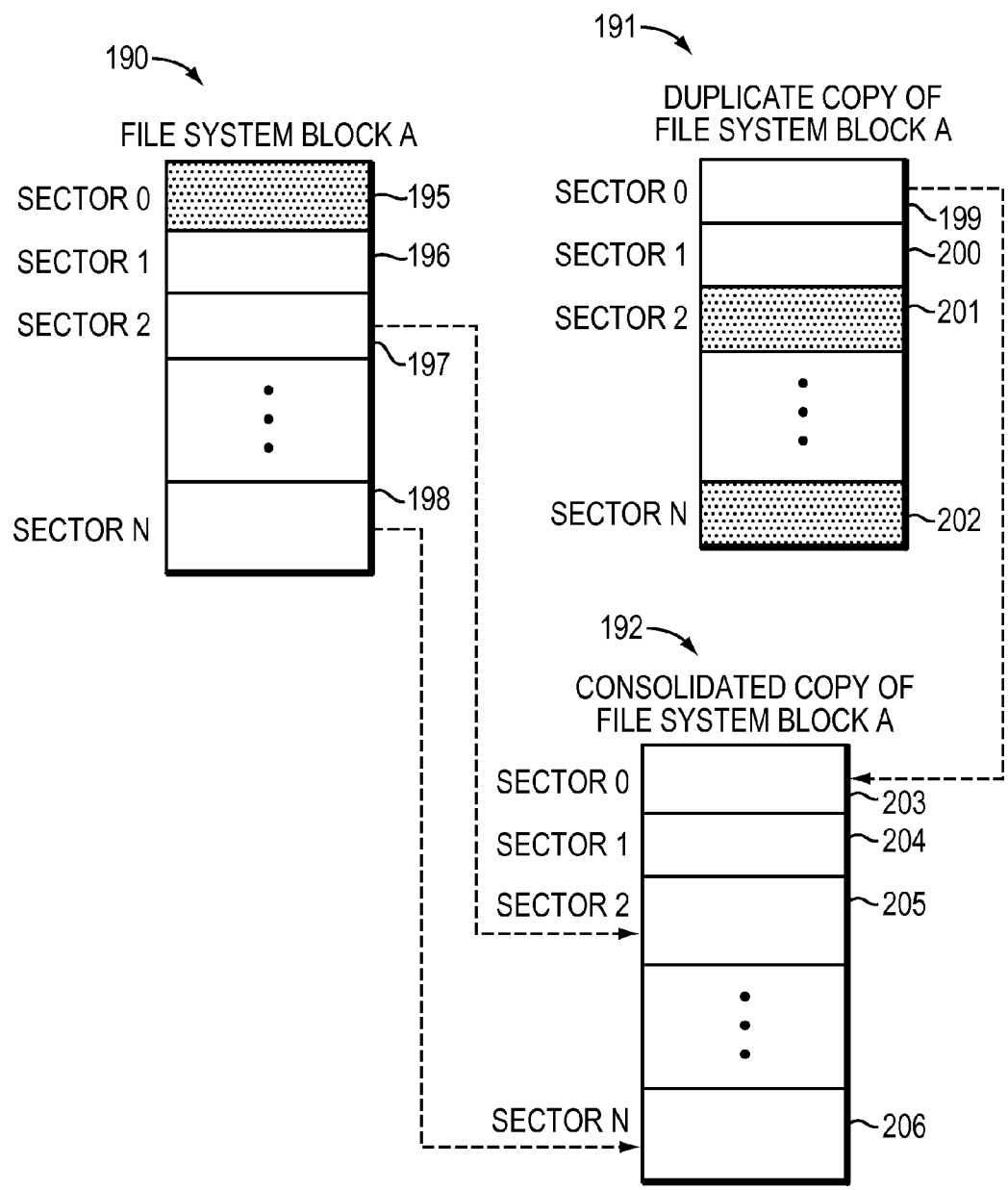

Referring to FIG. 10, shown is a detailed representation of components that may be included in an embodiment using the techniques described herein. With reference also to FIGS. 1-9, for example, as shown in FIG. 10, file system block A 190 may include metadata of a file system. Further, file system block A 190 may be organized in such a way that the metadata is stored in a set of sectors (e.g., sectors 195-198) of a storage device (e.g., disk). For example, in at least one embodiment, a file system block may be organized on 16 sectors. Further, data storage system 12 may include a duplicate copy 191 of the file system block A 190 that may be used when the file system is unable to access the file system block A 190. Similar to file system block A 190, duplicate file system block A 191 may be organized in such a way that the metadata is stored in a set of sectors (e.g., sectors 199-202) of a storage device (e.g., disk). For example, the file system may encounter an error such as a data loss error when accessing the file system block A 190 because sector-0 195 of the file system block A 190 may be inaccessible due to a problem such as a damaged or corrupted sector and may return a bad sector media error. In such a case, the file system attempts to read the duplicate copy 191 of the file system block A 190 but may encounter an error such as a data loss error when accessing the duplicate file system block A 191 because sector-2 201 and sector-N 202 of the duplicate file system block A 191 may be inaccessible due to a problem such as a damaged or corrupted sector and may return a bad sector media error. Conventionally, in such an example, if using a conventional technique, the file system is taken offline for executing a FSCK utility for recovering the file system. By contrast, in at least one embodiment of the current technique, the file system reads each sector of the file system block A 190 and each sector of the duplicate copy 191 of the file system block A 191 and creates an in-memory consolidated copy 192 of file system block A 190 such that sector-2 205 of the consolidated copy 192 includes contents from the file system block A 190, sector-0 203 of the consolidated copy 192 includes contents from the duplicate copy 191 of file system block A 190, and sector-N 206 of the consolidated copy 192 includes contents from the file system block A 190 thereby creating a temporary copy 192 of the file system block A 190 that does not include any damaged, corrupted or inconsistent sector but includes valid contents in each sector. Thus, in such a case, in at least one embodiment of the current technique, even though the file system encounters a double fault when both file system block A 190 and duplicate copy 191 of the file system block A 192 includes an unreadable sector causing the file system to receive a data loss error, the file system is able to create a consolidated copy 192 of file system block A 190 that does not include any unreadable sector. It should be noted that contents of a file system block may be organized into a set of chunks where each chunk may be a sector. However, it should be noted that a chunk of a file system block that is evaluated for recovering the file system block may be any other logical object such that contents of the file system block may be divided into a set of logical objects for evaluation.

Figure 11:
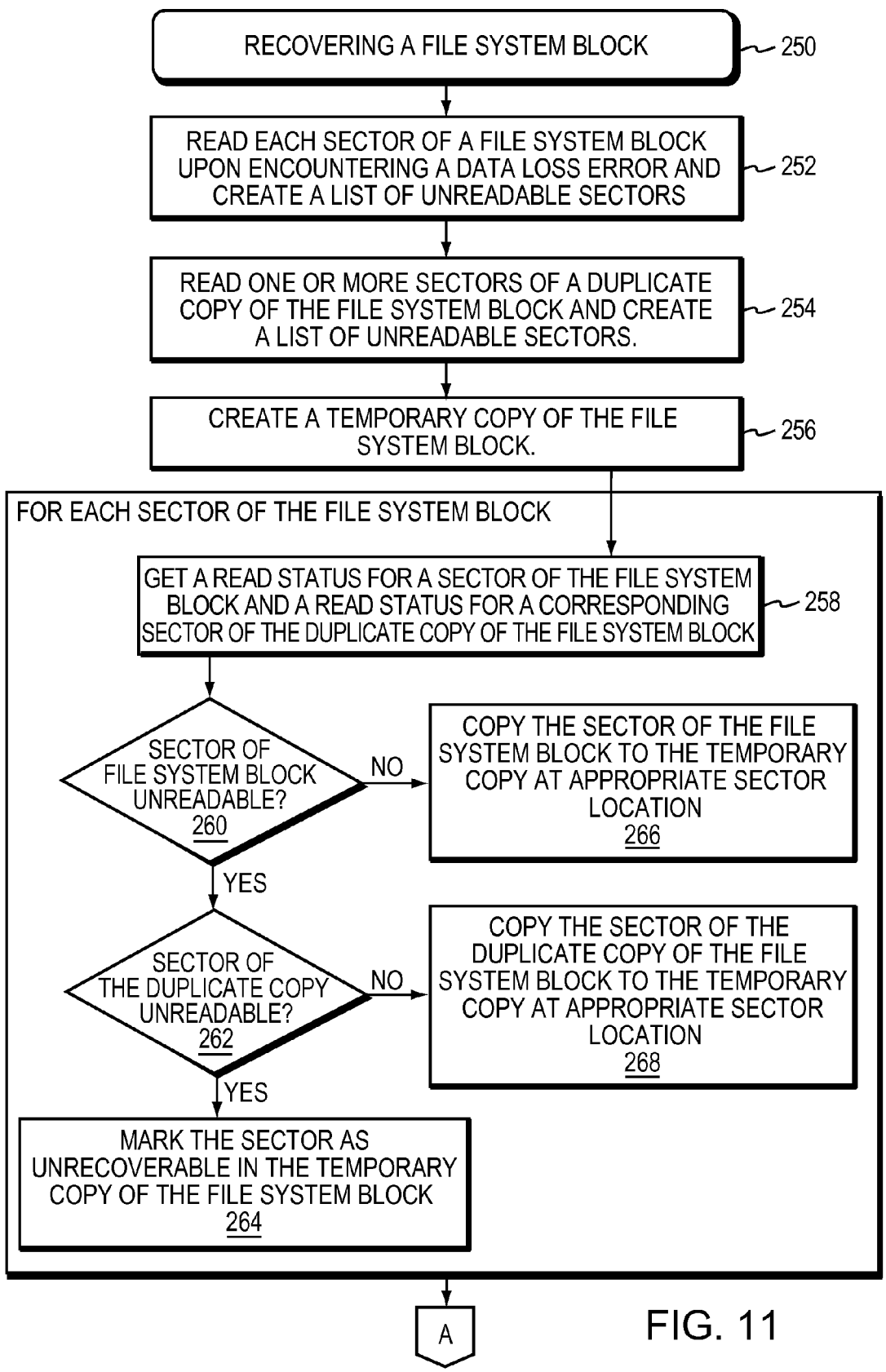
FIGS. 11-12 are flow diagrams illustrating processes that may be used in connection with techniques herein.

Referring to FIG. 11, shown is a flow diagram illustrating the method of recovering file system blocks of file systems. In at least one embodiment of the current technique, when a client sends a request to read from or write to a file system at a specified offset, the file system may need to access a file system block for reading metadata associated with data stored at the specified offset. Thus, the file system may read the file system block that stores the metadata which is required for performing the request received from the client. Further, upon attempting to access the file system block, if the file system encounters a read error such as a data loss error indicating loss of data because one or more sectors of the file system block returns an error such as a bad sector media error, the file system attempts to read the duplicate copy of the file system block. Further, upon accessing the duplicate copy of the file system block, if the file system again encounters a read error such as a data loss error indicating a double fault, the file system attempts to recover the file system data block (step 250). The file system reads each sector of the file system block and creates a list of unreadable sectors (step 252). An unreadable sector may indicate a damaged, corrupted or inconsistent sector. An unreadable sector returns an error such as a bad sector media error when a user attempts to read contents of the unreadable sector. The file system then reads sectors of the duplicate copy of the file system block and creates a list of unreadable sectors (step 254). It should be noted that a file system may read each sector of a duplicate copy of a file system block for creating a list of unreadable sectors. Alternatively, it should be noted that a file system may read only those sectors from a duplicate copy of a file system block that are unreadable in the file system block. The file system creates an in-memory temporary copy of the file system block (step 256). However, it should be noted that a temporary copy of a file system block may be stored in any one of the storage medium such as a volatile memory, a nonvolatile memory, cache, swap space and so on. The file system then consolidates contents of the file system block and the duplicate copy of the file system block by consolidating unreadable sectors of the file system block with readable sectors of the duplicate copy of the file system block. For each sector of the file system block, an attempt is made to read a sector of the file system block and a read status is obtained. Similarly, an attempt is made to read a corresponding sector of the duplicate copy of the file system block and a read status is obtained. (step 258). A determination is made based on the read statuses as to whether the sector of the file system block is unreadable due to a read error such as a bad sector media error (step 260). If the sector of the file system block is unreadable, a determination is made as to whether the corresponding sector of the duplicate copy of the file system block is unreadable as well due to a read status error such as a bad sector media error (step 262). If both the sectors are unreadable, the sector is marked as unrecoverable in the in-memory temporary copy of the file system block (step 264). However, if the sector of the file system block is readable, contents of the sector of the file system block are copied to the in-memory temporary copy of the file system block (step 266). Further, if the sector of the file system block is unreadable but the corresponding sector of the duplicate copy of the file system block is readable, contents of the corresponding sector of the duplicate copy of the file system block are copied to the in-memory temporary copy of the file system block (step 268). It should be noted that a file system may either read each sector of a file system block and read each corresponding sector of the duplicate copy of the file system block or read each unreadable sector of the file system block and read a corresponding sector of the duplicate copy of the file system block for recovering the unreadable sector of the file system block.

Figure 12:
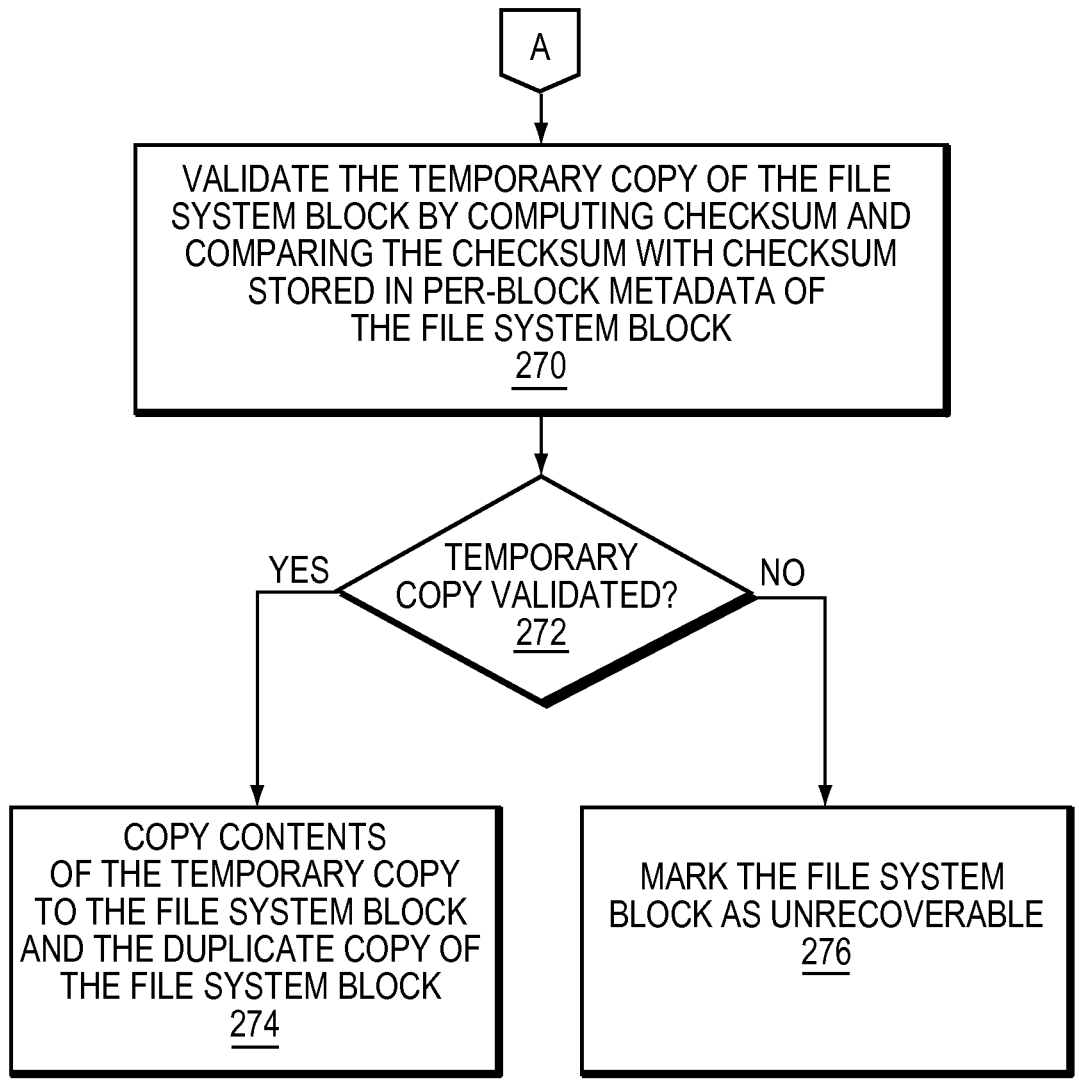

Referring to FIG. 12, shown is a flow diagram illustrating the method of recovering file system blocks of file systems. With reference also to FIG. 11, after each sector of the file system block is consolidated with each sector of the duplicate copy of the file system block by copying contents of readable sectors from the file system block and the duplicate copy of the file system block into the in-memory temporary copy of the file system block, the in-memory temporary copy of the file system block is validated by computing a checksum of the contents of the in-memory temporary copy of the file system block and comparing the computed checksum with checksum information stored in a per-block metadata of the file system block (270). A determination is made as to whether the computed checksum matches with the checksum stored in the per block metadata indicating successful validation of the in-memory temporary copy of the file system block (step 272). If the computed checksum matches with the checksum stored in the per block metadata, the file system block is recovered by copying contents of the in-memory temporary copy of the file system block to the file system block and the duplicate copy of the file system block stored on a storage device (step 274). However, if the computed checksum does not match with the checksum stored in the per block metadata, the file system block is marked as unrecoverable (step 276). Further, a FSCK utility is executed for recovering the file system block that has been marked as unrecoverable. Thus, a FSCK utility may use the current technique as described herein for recovering an unrecoverable file system block.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in recovering file system blocks of file systems, the method comprising:
    encountering a first error upon accessing a file system block of a file system, wherein the file system block includes a first set of chunks;
    encountering a second error upon accessing a duplicate copy of the file system block, wherein the duplicate copy of the file system block includes a second set of chunks, wherein each chunk of the second set of chunks includes a duplicate copy of respective chunk in the first set of chunks;
    determining a list of chunks from the first set of chunks by evaluating each chunk of the first set of chunks, wherein a read error is encountered upon reading each chunk of the list of chunks;
    based on the evaluation, evaluating the second set of chunks for determining whether the read error is encountered upon reading a respective duplicate copy of each chunk of the list of chunks from the second set of chunks; and
    based on the evaluation, recovering the file system block by creating a temporary copy of the file system block using information from the first and second sets of chunks.

2. The method of claim 1, wherein a file of the file system is associated with an inode, wherein the file includes a set of file system blocks organized in a file system block hierarchy, wherein a file system block includes a data block and an indirect block.

3. The method of claim 1, wherein a file system block of a file includes a set of chunks, wherein each chunk of the set of chunks includes a sector, wherein the sector represents a portion of storage space represented by the file system block on a storage device.

4. The method of claim 1, wherein a file system block of a file is associated with a per block metadata, wherein the per block metadata includes a checksum for validating the file system block.

5. The method of claim 1, further comprising:
    reading a chunk of a first set of chunks of the file system block of the file system; and
    reading a chunk of a second set of chunks of the duplicate copy of the file system block, wherein a logical offset at which the chunk of the file system block is located within the first set of chunks is same as a logical offset at which the chunk of the duplicate copy of the file system block is located within the second set of chunks.

6. The method of claim 5, further comprising:
    creating a temporary copy for recovering contents of the file system block.

7. The method of claim 6,
    determining a first result associated with reading the chunk of the first set of chunks;
    determining a second result associated with reading the chunk of the second set of chunks;
    copying contents of the chunk of the first set of chunks to a chunk of the temporary copy upon determining that the first result indicates that the chunk of the first set of chunks is readable and the second result indicates that the chunk of the second set of chunks is not readable; and
    copying contents of the chunk of the second set of chunks to a chunk of the temporary copy upon determining that the first result indicates that the chunk of the first set of chunks is not readable and the second result indicates that the chunk of the second set of chunks is readable.

8. The method of claim 6,
    computing checksum of contents of the temporary copy;
    comparing the checksum with checksum stored in a per block metadata of the file system block; and
    based on the comparison, validating the temporary copy.

9. The method of claim 6,
    copying contents of the temporary copy to the file system block; and
    copying contents of the temporary copy to the duplicate copy of the file system block.

10. A system for use in recovering file system blocks of file systems, the system comprising a processor configured to:
    encounter a first error upon accessing a file system block of a file system, wherein the file system block includes a first set of chunks;
    encounter a second error upon accessing a duplicate copy of the file system block, wherein the duplicate copy of the file system block includes a second set of chunks, wherein each chunk of the second set of chunks includes a duplicate copy of respective chunk in the first set of chunks;
    determine a list of chunks from the first set of chunks by evaluating each chunk of the first set of chunks, wherein a read error is encountered upon reading each chunk of the list of chunks;
    based on the evaluation, evaluate the second set of chunks for determining whether the read error is encountered upon reading a respective duplicate copy of each chunk of the list of chunks from the second set of chunks; and
    based on the evaluation, recover the file system block by creating a temporary copy of the file system block using information from the first and second sets of chunks.

11. The system of claim 10, wherein a file of the file system is associated with an inode, wherein the file includes a set of file system blocks organized in a file system block hierarchy, wherein a file system block includes a data block and an indirect block.

12. The system of claim 10, wherein a file system block of a file includes a set of chunks, wherein each chunk of the set of chunks includes a sector, wherein the sector represents a portion of storage space represented by the file system block on a storage device.

13. The system of claim 10, wherein a file system block of a file is associated with a per block metadata, wherein the per block metadata includes a checksum for validating the file system block.

14. The system of claim 10, further comprising:
read a chunk of a first set of chunks of the file system block of the file system; and
read a chunk of a second set of chunks of the duplicate copy of the file system block, wherein a logical offset at which the chunk of the file system block is located within the first set of chunks is same as a logical offset at which the chunk of the duplicate copy of the file system block is located within the second set of chunks.

15. The system of claim 14, further comprising:
create a temporary copy for recovering contents of the file system block.

16. The system of claim 15,
determine a first result associated with reading the chunk of the first set of chunks;
determine a second result associated with reading the chunk of the second set of chunks;
copy contents of the chunk of the first set of chunks to a chunk of the temporary copy upon determining that the first result indicates that the chunk of the first set of chunks is readable and the second result indicates that the chunk of the second set of chunks is not readable; and
copy contents of the chunk of the second set of chunks to a chunk of the temporary copy upon determining that the first result indicates that the chunk of the first set of chunks is not readable and the second result indicates that the chunk of the second set of chunks is readable.

17. The system of claim 15,
compute checksum of contents of the temporary copy;
compare the checksum with checksum stored in a per block metadata of the file system block; and
validate, based on the comparison, the temporary copy.

18. The system of claim 15,
copy contents of the temporary copy to the file system block; and
copy contents of the temporary copy to the duplicate copy of the file system block.

* * * * *